(12) United States Patent
Xu et al.

(10) Patent No.: US 11,634,566 B2
(45) Date of Patent: *Apr. 25, 2023

(54) RUBBER COMPOSITION, PROCESSING METHOD THEREOF, AND RUBBER PRODUCT USING THE SAME

(71) Applicant: HANGZHOU XINGLU TECHNOLOGIES CO., LTD, Zhejinag (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/477,777

(22) PCT Filed: Jan. 12, 2018

(86) PCT No.: PCT/CN2018/072365
§ 371 (c)(1),
(2) Date: Jul. 12, 2019

(87) PCT Pub. No.: WO2018/130194
PCT Pub. Date: Jul. 19, 2018

(65) Prior Publication Data
US 2020/0123354 A1    Apr. 23, 2020

(30) Foreign Application Priority Data

Jan. 13, 2017 (CN) .......................... 201710024892.2
Jan. 10, 2018 (CN) .......................... 201810020838.5

(51) Int. Cl.
| | |
|---|---|
| *C08L 23/06* | (2006.01) |
| *B60C 1/00* | (2006.01) |
| *B65G 15/34* | (2006.01) |
| *C08L 23/16* | (2006.01) |
| *H01B 3/28* | (2006.01) |

(52) U.S. Cl.
CPC .......... *C08L 23/06* (2013.01); *B60C 1/0016* (2013.01); *B60C 1/0025* (2013.01); *B65G 15/34* (2013.01); *C08L 23/16* (2013.01); *H01B 3/28* (2013.01); *B60C 2200/12* (2013.01); *C08L 2201/08* (2013.01); *C08L 2203/202* (2013.01); *C08L 2205/025* (2013.01); *C08L 2205/03* (2013.01); *C08L 2207/07* (2013.01)

(58) Field of Classification Search
None
See application file for complete search history.

(56) References Cited

U.S. PATENT DOCUMENTS

| | | | |
|---|---|---|---|
| 4,128,523 A | 12/1978 | Britton et al. | |
| 3,806,558 A | 4/1987 | Fischer | |
| 6,103,658 A | 8/2000 | Mackenzie et al. | |
| 6,660,677 B1 | 12/2003 | Mackenzie et al. | |
| 7,338,999 B2 * | 3/2008 | Yagi ...................... | B60C 1/0016 |
| | | | 524/493 |
| 2006/0074177 A1 | 4/2006 | Dharmarajan et al. | |
| 2009/0099317 A1 * | 4/2009 | Achten ................... | C08L 67/00 |
| | | | 525/387 |

FOREIGN PATENT DOCUMENTS

| | | | | |
|---|---|---|---|---|
| CN | 101531725 A | | 9/2009 | |
| CN | 101812145 A | | 8/2010 | |
| CN | 102827312 A | | 12/2012 | |
| CN | 103980596 A | * | 8/2014 | ............ B29C 35/02 |
| CN | 103980596 A | | 8/2014 | |
| CN | 104212079 A | | 12/2014 | |
| CN | 104312018 B | | 1/2015 | |
| CN | 104592605 A | * | 5/2015 | |
| CN | 104877255 A | * | 9/2015 | |
| CN | 104926962 A | | 9/2015 | |
| CN | 105504548 A | | 4/2016 | |
| CN | 105622803 A | | 6/2016 | |
| WO | 0157101 A1 | | 8/2001 | |

OTHER PUBLICATIONS

CN 104592605 A, Machine Translation, May 2015 (Year: 2015).*
CN 104877255 A, Machine translation, Jun. 2015 (Year: 2015).*
CN-103980596-A, Aug. 2014, Machine translation (Year: 2014).*
SIPO, International Search Report issued in IA Application No. PCT/CN2018/072365, dated Mar. 27, 2018.

* cited by examiner

*Primary Examiner* — Satya B Sastri
(74) *Attorney, Agent, or Firm* — Lorenz & Kopf, LLP

(57) ABSTRACT

The present invention discloses a rubber composition, production method thereof and a rubber product using the same. The rubber composition includes a rubber matrix and essential components. Based on 100 parts by weight of the rubber matrix, the rubber matrix includes a branched polyethylene with a content represented as A, in which $0<A\leq100$, and an EPM and an EPDM with a total content represented as B, in which $0\leq B<100$; and the essential components include 1.5 to 10 parts of a crosslinking agent and 40 to 200 parts of a reinforcing filler. The reinforcing filler includes carbon black and silica and can also include any one or more of calcium carbonate, talcum powder, calcined clay, magnesium silicate, and magnesium carbonate, wherein the content of the carbon black is 5 to 100 parts, and the content of the silica is 5 to 60 parts. The rubber composition is used for producing rubber product with better yield and tear strength and service performance. The rubber product include high-strength insulation compound for preparing wire and cable, waterproof coil, and high-temperature resistant conveyor belt.

14 Claims, No Drawings

RUBBER COMPOSITION, PROCESSING METHOD THEREOF, AND RUBBER PRODUCT USING THE SAME

CROSS REFERENCE TO RELATED APPLICATIONS

The present application is the U.S. national phase of and claims priority to International Patent Application No. PCT/CN2018/072365 filed on Jan. 12, 2018, which claims the benefit of priority from China National Application No. 201710024892.2, filed on Jan. 13, 2017 and China National Application No. 201810020838.5, filed on Jan. 10, 2018, the entire content of each of which is incorporated herein by reference into the present disclosure as if fully set forth herein.

TECHNICAL FIELD

The present invention belongs to the field of rubber, in particular to a rubber composition and a processing method thereof, and further to application of the rubber composition in rubber products with better tear strength, adhesiveness and the like, and a production method of the rubber products. The rubber products include, but are not limited to, high-strength insulation compound for wire and cable, high-temperature resistant conveyor belt, waterproof coil, and the like.

BACKGROUND

In the field of rubber products, the two most commonly used fillers with higher reinforcement are carbon black and silica. Reinforcing and filling systems using both silica and carbon black can endow with the rubber products better tear resistance, adhesiveness and wear resistance, less heat generation and the like in comparison with reinforcing and filling systems without silica. The reinforcing and filling systems using both silica and carbon black are widely applied to the fields of tire tread rubber, tire sidewall rubber, waterproof coil, covering rubber of conveyor belts, and the like. Due to good aging resistance, the ethylene propylene rubber is widely applied to waterproof coil and covering rubber of heat-resistant conveyor belts. Sulfur vulcanization and peroxide vulcanization are the two most commonly used vulcanization systems for the ethylene propylene rubber. In order to obtain better aging resistance and high temperature resistance, the peroxide vulcanization is used. However, the tensile strength and tear strength of the ethylene propylene rubber processed by the peroxide vulcanization are weaker than those of the ethylene propylene rubber processed by the sulfur vulcanization, so that a part of performance advantages benefiting from the silica are counteracted, and the ethylene propylene rubber is easier to damage in a using process.

The covering rubber of a heat-resistant conveyor belt, disclosed in a Chinese patent No. CN104312018B, includes EPM, EPDM with low Mooney viscosity, carbon black with high wear resistance, zinc methacrylate, silica, paraffin, an adhesion promoter, resorcinol, an anti-aging agent, and the like, and does not emphasize good mechanical properties.

The high tear-resistant peroxide EPDM preparation material, disclosed in a Chinese patent No. CN105504548A, is prepared from the following raw materials in parts by weight: EPDM, zinc oxide, stearic acid, an anti-aging agent RD, polyethylene glycol PEG4000, silica, carbon black, light calcium carbonate, paraffin oil 2280, sulfur, a cross-linking agent BIPB, and a crosslinking agent TAIC. The main component of the rubber matrix is the EPDM, and the mechanical properties of the EPDM are not as good as those of natural rubber or styrene-butadiene rubber. How to further improve the aging resistance and mechanical properties of the ethylene propylene rubber is a problem.

Ethylene propylene rubber is a kind of synthetic rubber with a saturated molecular backbone, and include ethylene-propylene monomer (EPM) and ethylene-propylene-diene monomer (EPDM), both of which have good aging resistance. The EPDM is commonly used in ethylene propylene rubber products. However, since the EPDM contains a third monomer with a molecular chain having a double bond and the EPM has a completely saturated molecular chain, the EPM has more excellent aging resistance. Therefore, in a situation where a higher requirement is raised for the aging resistance, it is a common technical solution to use the EPM in combination to improve the aging resistance of the EPDM. However, the mechanical strength of the EPM is low, which affects the overall physical and mechanical properties.

The EPM is a copolymer of ethylene and propylene, which is a copolymer of ethylene and α-olefin. The copolymer of ethylene and α-olefin is a polymer containing only carbon and hydrogen elements and having a saturated molecular chain. The common types of carbon atoms found in such polymers generally include primary carbon, secondary carbon and tertiary carbon, in which the tertiary carbon atoms are most susceptible to hydrogen abstraction to form free radicals. Accordingly, the proportion of the tertiary carbon atoms in all carbon atoms is generally considered to be a main factor affecting the aging resistance of the copolymer of ethylene and α-olefin. The lower the proportion is, the better the aging resistance will be. The proportion can be expressed by the degree of branching. For example, the EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. The EPM usually has an ethylene content of 40 to 65% or 40 to 60% by weight, so the degree of branching is generally in the range of 117 to 200 branches/1000 carbon atoms or 133 to 200 branches/1000 carbon atoms. This degree of branching is considered to be higher than that of other common copolymers of ethylene and α-olefin.

In the prior art, the α-olefin in the common copolymers of ethylene and α-olefin may include, in addition to propylene, α-olefin having a carbon atom number of not less than 4, which may be selected from $C_4$-$C_{20}$ α-olefin, and is generally selected from 1-butylene, 1-hexene and 1-octylene. If the degree of branching of a copolymer of ethylene and α-olefin is too low, the melting point and the crystallinity are too high, so it is not suitable for use as a rubber component. If the degree of branching is too high, the content of α-olefin is higher, which leads to higher process difficulty and raw material cost, and lower operability and economical efficiency. In the prior art, polyolefin obtained by copolymerizing ethylene with 1-butylene or ethylene with 1-octylene can be referred to as a polyolefin plastomer or a polyolefin elastomer according to the magnitudes of crystallinity and melting points. Due to their proper crystallinity and melting points, some polyolefin elastomer brands can be well used in combination with the ethylene propylene rubber and have a lower degree of branching, so they are considered to be an ideal material for improving the aging resistance of the ethylene propylene rubber, and can be used in place of the ethylene propylene rubber to some extent. Since a copolymer of ethylene and 1-octylene has more flexible molecular chain, higher rubber elasticity, and better physical and mechanical properties than a copolymer of ethylene and 1-butylene, the polyolefin elastomer commonly used in rubber products is generally a copolymer of ethylene and 1-octylene at present, in which the octylene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of the EPM. Therefore, the copolymer of ethylene and 1-octylene has excellent aging resistance and good physical and mechanical properties.

The rubber are usually used after crosslinking. Among common crosslinking methods for the ethylene propylene rubber, peroxide crosslinking or radiation crosslinking can be suitably used for the copolymer of ethylene and α-olefin, both of which mainly comprise: forming a tertiary carbon free radical by hydrogen abstraction from tertiary carbon and then creating a carbon-carbon crosslink by free radical bonding. However, the copolymer of ethylene and 1-octylene (hereinafter referred to as POE) has a small number of tertiary carbon atoms and has long branches attached to the tertiary carbon atoms, so the steric hindrance is large, and free radical reaction is difficult to occur, resulting in difficulty in crosslinking, thus affecting the processing efficiency and product properties.

Therefore, there is currently a need for a better technical solution, which can improve the aging resistance of the ethylene propylene rubber while the rubber composition has better physical and mechanical properties and crosslinking properties, and is expected to have good properties with respect to specific functional indexes (such as compression set resistance) required for rubber products.

SUMMARY

Aiming at the problems existing in the prior art, the present invention provides a rubber composition and a processing method thereof, and also provides a production method for producing rubber products by using the rubber composition. The branched polyethylene having a degree of branching of not less than 50 branches/1000 carbon atoms is used for replacing a part of or all of the ethylene propylene rubber, thereby improving the yield of the rubber products and the properties of the rubber products.

In order to achieve the above objectives, the present invention adopts the following technical solution: a rubber composition is provided and includes a rubber matrix and essential components. The rubber matrix includes a branched polyethylene with a content represented as A, in which $0<A\leq 100$, and an EPM and an EPDM with a total content represented as B, in which $0\leq B<100$. The essential components include 1.5 to 10 parts of a crosslinking agent and 40 to 200 parts of a reinforcing filler. The reinforcing filler includes two or more of carbon black, silica, calcium carbonate, talcum powder, calcined clay, magnesium silicate, and magnesium carbonate, wherein the content of the carbon black is 5 to 100 parts, and the content of the silica is 5 to 60 parts. The branched polyethylene has a degree of branching of not less than 50 branches/1000 carbon atoms, a weight average molecular weight of not less than 50,000, and a Mooney viscosity ML(1+4) at 125° C. of not less than 2.

"Branched polyethylene" in the prior art can also refer to a saturated vinyl copolymer with branches in addition to an ethylene homopolymer with branches, such as an ethylene-α-olefin copolymer, which can be POE. Although the POE performs well in physical and mechanical properties and aging resistance, the crosslinking properties are poor. Therefore, although the branched polyethylene of the present invention can include both a branched ethylene homopolymer and the POE, it is preferred that the branched polyethylene includes a high proportion of or exclusively a branched ethylene homopolymer. In a preferred technical solution of the present invention, the branched polyethylene includes exclusively a branched ethylene homopolymer.

In the further elaboration of the technical solution of the present invention, unless otherwise specified, the used branched polyethylene is a branched ethylene homopolymer.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method mainly comprises the step of catalyzing ethylene homopolymerization based on a "chain walking mechanism" in the presence of a late transition metal catalyst. Preferably, the late transition metal catalyst is an (α-diimine) nickel/palladium catalyst. The nature of the chain walking mechanism refers to the fact that a β-hydrogen elimination reaction and a re-insertion reaction tend to occur in a process of catalyzing olefin polymerization in the presence of a late transition metal catalyst, such as an (α-diimine)nickel/palladium catalyst, thereby generating branches. The branches of the branched polyethylene based on the backbone may have different numbers of carbon atoms, and specifically 1 to 6 or more carbon atoms.

The production cost of the (α-diimine) nickel catalyst is significantly lower than that of the (α-diimine) palladium catalyst, and the (α-diimine) nickel catalyst has a high rate and high activity in catalyzing ethylene polymerization, and is thus more suitable for industrial application. Therefore, in the present invention, the (α-diimine) nickel catalyst is preferably used in preparation of the branched polyethylene by catalyzing ethylene polymerization.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching of the branched polyethylene used in the present invention is between the degree of branching of the POE and the degree of branching of the EPM, constituting a new technical solution that is different from the prior art. Therefore, the rubber matrix of present invention has both excellent aging resistance and good crosslinking properties.

The crosslinking properties include factors such as crosslinking density and crosslinking rate, and are the specific properties of the crosslinking capability of the rubber matrix in the manufacturing process.

The branched polyethylene used in the present invention preferably has a methyl branch content of 40% or more or 50% or more, and has a similarity in structure with the EPM. In terms of the crosslinking capability, the degree of branching (the content of tertiary carbon atoms) and the steric hindrance around the tertiary carbon atoms are the two main factors affecting the crosslinking capability of saturated polyolefin. Compared with the EPM, the branched polyethylene used in the present invention has a lower degree of branching, and since the branched polyethylene has branches with the carbon number of not less than 2, the steric hindrance around the tertiary carbon atoms of the branched polyethylene used in the present invention is theoretically greater than that of the EPM. Taking the two factors into account, it can be inferred that the crosslinking capability of the branched polyethylene used in the present invention is weaker than that of the EPM and further weaker than that of the EPDM. However, the actual crosslinking capability of the partially branched polyethylene used in the present invention is close to, and can even be equal to or better than that of the EPDM. This means that the rubber composition of the present invention can achieve good aging resistance while the crosslinking capability is not weakened, and can even have excellent crosslinking properties to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking capability of a saturated polyolefin elastomer by using the secondary branch structure with lower steric hindrance.

According to the technical solution of the present invention, it is also considered to be within the technical protection scope of the present invention to include a vinyl copolymer having a secondary branch structure or other saturated hydrocarbon polymers in the rubber matrix. The vinyl copolymer refers to a copolymer of ethylene and α-olefin with branches and has a secondary branch structure, wherein the α-olefin with branches may be selected from isobutylene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, 6-methyl-1-heptene and the like, and the comonomer may also simultaneously include common linear chain α-olefin.

It is generally believed in the prior art that the branched polyethylene prepared in the presence of the (α-diimine) nickel catalyst is difficult to have a secondary branch structure i.e. at least difficult to fully identify, and the technical solution of the present invention also provides a new idea for analyzing the structure of the branched polyethylene.

Compared with the ethylene propylene rubber, when the branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the backbones than the ethylene propylene rubber, which can effectively avoid the stress concentration, and contribute to better mechanical properties.

In a preferred embodiment, based on 100 parts by weight, the rubber matrix includes a branched polyethylene with a content represented as A, in which $10 \leq A \leq 100$, and an EPM and an EPDM with a total content represented as B, in which $0 \leq B \leq 90$, and the branched polyethylene is an ethylene homopolymer having a degree of branching of 60 to 130 branches/1000 carbon atoms, a weight average molecular weight of 66,000 to 518,000, and a Mooney viscosity ML(1+4) at 125° C. of 6 to 102.

In a preferred embodiment, based on 100 parts by weight, the rubber matrix includes a branched polyethylene with a content represented as A, in which $10 \leq A \leq 100$, and an EPM and an EPDM with a total content represented as B, in which $0 \leq B \leq 90$, and the branched polyethylene is an ethylene homopolymer having a degree of branching of 70 to 116 branches/1000 carbon atoms, a weight average molecular weight of 201,000 to 436,000, and a Mooney viscosity ML(1+4) at 125° C. of 23 to 101.

In a preferred embodiment, based on 100 parts by weight, the rubber matrix includes a branched polyethylene with a content represented as A, in which $10 \leq A \leq 100$, and an EPM and an EPDM with a total content represented as B, in which $0 \leq B \leq 90$, and the branched polyethylene is an ethylene homopolymer having a degree of branching of 80 to 105 branches/1000 carbon atoms, a weight average molecular weight of 250,000 to 400,000, and a Mooney viscosity ML(1+4) at 125° C. of 40 to 95.

In a preferred embodiment, based on 100 parts by weight, the rubber matrix includes a branched polyethylene with a content represented as A, in which $10 \leq A \leq 100$, and an EPM and an EPDM with a total content represented as B, in which $0 \leq B \leq 90$, and the branched polyethylene is an ethylene homopolymer having a degree of branching of 80 to 105 branches/1000 carbon atoms, a weight average molecular weight of 268,000 to 356,000, and a Mooney viscosity ML(1+4) at 125° C. of 42 to 80.

In a preferred embodiment, a third monomer of the EPDM is preferably a diene monomer, particularly selected from a group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like. Particularly, the ethylene propylene rubber can simultaneously include two or more diene monomers. For example, the ethylene propylene rubber can simultaneously include 5-ethylidene-2-norbornene and 5-vinyl-2-norbornene. The functional group of the diene monomer can play the same role as an intrinsic auxiliary crosslinking agent in peroxide vulcanization to improve the crosslinking efficiency, thereby being favorable for reducing the dosage and residual quantity of the required crosslinking agents and auxiliary crosslinking agents and lowering the cost required for adding the crosslinking agents and the auxiliary crosslinking agents. The weight ratio of the diene monomer in the ethylene propylene rubber is preferably 1% to 14%, more preferably 3% to 10%, and further preferably 4% to 7%.

In a preferred embodiment, the silica includes at least one of precipitated silica and fumed silica.

In a preferred embodiment, the carbon black includes at least one of N220, N330, N550, N660, N774, and N990.

In a preferred embodiment, the crosslinking agent includes at least one of a peroxide crosslinking agent and sulfur, and the peroxide crosslinking agent includes at least one of di-tert-butyl peroxide, dicumyl peroxide, tert-butyl cumyl peroxide, 1,1-di-tert-butyl peroxide-3,3,5-trimethyl-cyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a preferred embodiment, the rubber composition also includes auxiliary components, and based on 100 parts by weight of the rubber matrix, the auxiliary components include: 0.2 to 20 parts of an auxiliary crosslinking agent, 5 to 100 parts of a plasticizer, 1 to 3 parts of a stabilizer, 2 to 10 parts of a metal oxide, 1 to 10 parts of a surface modifier, 0 to 3 parts of a vulcanization accelerator, and 0 to 20 parts of a binder.

In a preferred embodiment, the stabilizer includes at least one of 2,2,4-trimethyl-1,2-dihydroquinoline polymer (RD), 6-ethoxy-2,2,4-trimethyl-1,2-dihydroquinoline (AW), 2-mercaptobenzimidazole (MB), and N-4(anilinophenyl) maleimide (MC).

In a preferred embodiment, the auxiliary crosslinking agent includes at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis (furfurylidene)acetone, 1,2-polybutadiene, sulfur, and a metal salt of unsaturated carboxylic acid.

In a preferred embodiment, the plasticizer includes at least one of pine tar, engine oil, naphthenic oil, paraffin oil, coumarone, RX-80, stearic acid, paraffin, and liquid polyisobutylene, wherein the stearic acid can also play a role of an activator in a sulfur vulcanization-based system and can be combined with some metal oxides to form a soluble salt so as to increase the activation of the metal oxides to the accelerator. The reasonable use of the plasticizer can increase the elasticity of a rubber material and the plasticity suitable for technological operation. In order to increase the adhesion, additives with a tackifying effect, such as pine tar, coumarone, RX-80 and liquid polyisobutylene, can also be used preferably.

In a preferred embodiment, the metal oxide includes at least one of zinc oxide, magnesium oxide, and calcium oxide.

In a preferred embodiment, the surface modifier includes at least one of polyethylene glycol, diphenyl silandiol, triethanolamine, vinyl tris(2-methoxyethoxy)silane (A-172), γ-glycidyloxypropyl trimethoxysilane (A-187), and γ-mercaptopropyl trimethoxysilane (A-189) with a molecular weight of 2000 or 3400 or 4000.

In a preferred embodiment, the vulcanization accelerator includes at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

In a preferred embodiment, the resorcinol donor can be selected from at least one of resorcinol (binder R), a binder RS, a binder RS-11, a binder R-80, a binder RL, a binder PF, a binder PE, a binder RK, and a binder RH, and the methylene donor can be selected from at least one of hexamethylenetetramine (HMTA), a binder H-80, a binder A, a binder RA, a binder AB-30, a binder Rq, a binder RC, a binder CS963, and a binder CS964.

In a preferred embodiment, the binder can also be selected from triazine binders, specifically selected from at least one of commercial grades including a binder TAR, a binder TZ, a binder AIR-1, and a binder AIR-101, and preferably at least one of a binder AIR-1 and a binder AIR-101, and the triazine binder can partially replace the resorcinol donor binder and has the advantages of good binding property and relative environmental protection. In an embodiment of the present invention, in order to improve the adhesion of the rubber compound, the rubber composition can further include a tackifier. The pine tar, coumarone resin, RX-80, and liquid polyisobutylene in the plasticizer also have a tackifying effect. Liquid coumarone resin has a better tackifying effect than that of solid coumarone resin. The tackifier can also be selected from C5 petroleum resin, C9 petroleum resin, hydrogenated rosin, terpene resin, alkyl phenolic resin, modified alkyl phenolic resin, alkylphenol-acetylene resin, and other commonly used tackifiers. Based on 100 parts by weight of the rubber matrix, the tackifier is usually used in an amount of not more than 30 parts by weight, further preferably not more than 10 parts by weight, and further preferably not more than 5 parts by weight.

The crosslinking agent, the auxiliary crosslinking agent and the vulcanization accelerator involved in the rubber composition provided by the present invention all belong to a crosslinking system.

The rubber composition of the present invention can exist in a form of an uncrosslinked rubber mix, and can exist in a form of vulcanized rubber after further crosslinking reaction. The vulcanized rubber can also be simply referred to as vulcanizate.

The present invention also provides a processing method for obtaining the rubber composition, and the processing method comprises the following steps:

step 1: setting the temperature and the rotor speed of an internal mixer, sequentially adding other components of the rubber composition than the crosslinking system according to parts by weight to the internal mixer, and performing mixing;

step 2: then, adding the crosslinking system, performing mixing uniformly, and then, discharging a rubber mix;

step 3: plasticating the rubber mix on an open mill, then, unloading the sheet, and allowing the sheet to stand for vulcanization;

step 4: then, performing vulcanization according to a vulcanization process.

The crosslinking system includes a crosslinking agent and also includes at least one of an auxiliary crosslinking agent and a vulcanization accelerator. In order to improve the mechanical properties and compression set resistance of the vulcanized rubber, a post vulcanization process can be further used for vulcanization.

The present invention provides a high-strength insulation compound for wire and cable, and the rubber compound used for the insulation compound comprises the rubber composition.

The present invention also provides a method for producing the high-strength insulation compound for wire and cable. The production method comprises the following steps:

(1) rubber mixing: setting the temperature and the rotor speed of an internal mixer, adding a rubber matrix, and performing pre-pressing and mixing; then, adding zinc oxide, stearic acid, and a surface modifier, and performing mixing; then, adding a reinforcing filler and the rest of plasticizer, and performing mixing; then, adding a crosslinking agent and an auxiliary crosslinking agent, performing mixing, then, discharging the rubber, plasticating the rubber mix on an open mill, unloading the sheet, and allowing the sheet to stand;

(2) granulation: putting the rubber mix into an extruding machine so as to be extruded, sheared, and granulated and then performing packaging.

The present invention also provides a waterproof coil, and the rubber compound used comprises the rubber composition.

The present invention also provides a method for producing the waterproof coil. The production method of the waterproof coil comprises the following steps:

(1) mixing: setting the temperature and the rotor speed of an internal mixer, adding a rubber matrix, and performing pre-pressing and mixing; then, adding zinc oxide, stearic acid, a surface modifier, and a stabilizer, and performing mixing; then, adding a reinforcing filler and the rest of plasticizer, and performing mixing; then, adding a crosslinking agent and an auxiliary crosslinking agent, performing mixing, and then, discharging the rubber; conveying a blocky rubber mix into an open mill so as to be mixed and plasticated until the surface of the rubber mix is smooth, then, mixing and plasticating the rubber material again to obtain a uniformly-mixed rubber material rough sheet, and then, cooling, unloading and stacking the sheet;

(2) hot milling: performing hot milling on the uniformly-mixed rough rubber sheet on an open mill while controlling the roller temperature and the roller spacing until the rubber sheet is smooth and uniform, and then, preliminarily coiling the rubber sheet;

(3) calendering: putting the rubber sheet which is preliminarily coiled by means of hot milling on a calender, and adjusting the roller spacing according to the thickness requirement of a finished product to perform calendering so as to obtain a semi-finished coil meeting the thickness specification requirement of the finished product;

(4) coiling: sandwiching an isolation liner layer according to the specification length requirement of the finished coil, and tidying the semi-finished coil into a coil;

(5) vulcanization: putting the coil which is tidied into the coil into a nitrogen-filled vulcanization kettle so as to be vulcanized;

(6) recoiling: opening the vulcanized coil again, taking out the isolation liner layer, and then, recoiling and packaging the coil to obtain a product.

The present invention also provides a high-temperature resistant conveyor belt, having working surface covering rubber and non-working surface covering rubber, at least one layer of which comprises the rubber composition.

The present invention also provides a method for producing the high-temperature resistant conveyor belt, the working surface covering rubber of the high-temperature resistant conveyor belt comprises the rubber composition, and the components and proportions of the working surface covering rubber are metered in parts. The production method comprises the following steps:

(1) rubber mixing process: firstly, sequentially adding other components of the rubber composition than the crosslinking system in parts by weight to an internal mixer, performing mixing, then, adding the crosslinking system, performing mixing uniformly, then, discharging a rubber mix, plasticating the rubber mix on an open mill, then, unloading the sheet, and allowing the sheet to stand for vulcanization, wherein the crosslinking system includes a crosslinking agent and can also include at least one of an auxiliary crosslinking agent and a vulcanization accelerator;

(2) calendering process: putting the rubber mix into a screw extruder so as to be subjected to hot milling, then, conveying the rubber mix after hot milling into a calender so as to be calendered, and then, discharging the sheet for later use, wherein the thickness of the rubber sheet is controlled to be 4.5 to 12 mm in the processes of calendering and discharging the sheet, and after the sheet is discharged, the temperature of the sheet is kept for later use;

(3) forming process: closely attaching the rubber sheet and a preformed rubberized canvas belt blank together on a forming machine to form a belt blank of a high-temperature resistant conveyor belt, then, coiling the belt blank, and after 4 h, vulcanizing the belt blank;

(4) vulcanization process: putting the formed belt blank of the conveyor belt into a press vulcanizer so as to be vulcanized in sections, wherein for each plate, the vulcanization time is 25 to 30 min, the vulcanization pressure is 2.5 to 4 MPa, and the vulcanization temperature is 155 to 170° C.

The present invention also provides a tire, and at least one of the rubber compound used for the tire sidewall of the tire and the rubber compound used for the tread of the tire comprises the rubber composition.

The tire provided by the present invention is preferably used as a cycle tire or an agricultural machine tire, wherein the cycle tire can be a non-motorized tire such as a bicycle tire, a trolley tire, an animal power vehicle tire, and an electric vehicle tire. The agricultural machine tire can be used for tractors, combine harvesters, and other agricultural vehicles.

The rubber composition of the present invention can be used as sidewall rubber, and a tire can be produced by a common method. That is, the rubber mix is subjected to extrusion processing in accordance with the sidewall shape of the tire design, and is formed together with other tire members by a common method on a tire forming machine to form an unvulcanized tire. The unvulcanized tire is heated and pressurized in a vulcanizer to obtain the tire.

The rubber composition of the present invention can be used as tread rubber, and a tire can be produced by a common method. That is, the rubber mix is subjected to extrusion processing in accordance with the tread shape of the tire design, and is formed together with other tire members by a common method on a tire forming machine to form an unvulcanized tire. The unvulcanized tire is heated and pressurized in a vulcanizer to obtain the tire.

A steel wire or fiber skeleton used in the above tires is preferably of a surface treated type which can be well bonded to non-polar rubber. Surface treatment can adopt an RFL impregnation system for soaking.

The present invention has the beneficial effects that a new rubber composition is provided, and the branched polyethylene is used for replacing a part or all of the ethylene propylene rubber, and can be applied to rubber products reinforced by silica and carbon black to simultaneously obtain good heat resistance, compression set resistance and mechanical strength under a peroxide vulcanization system.

DETAILED DESCRIPTION

The present invention is further described through examples below, but such examples are not intended to limit the scope of the present invention. Some non-essential improvements and adjustments made by those skilled in the art to the present invention shall also fall within the protection scope of the present invention.

In order to more clearly describe the examples of the present invention, the materials involved in the present invention are defined below.

The crosslinking system includes a crosslinking agent and can also include at least one of an auxiliary crosslinking agent and a vulcanization accelerator.

The Mooney viscosity ML(1+4) at 125° C. of the used EPM is preferably 20 to 50 and further preferably 40 to 50, and the ethylene content is preferably 45 to 60%.

The Mooney viscosity ML(1+4) at 125° C. of the used EPDM is preferably 20 to 100 and further preferably 40 to 80, the ethylene content is preferably 55 to 75%, the third monomer is 5-ethylidene-2-norbornene, 5-vinyl-2-norbornene or dicyclopentadiene, and the content of the third monomer is 1% to 7%.

The used branched polyethylene can be obtained by catalyzing ethylene homopolymerization by means of an (α-diimine) nickel catalyst under the action of a co-catalyst. The structure and synthetic method of the used (α-diimine) nickel catalyst and the method for preparing the branched polyethylene by means of the (α-diimine) nickel catalyst are disclosed in the prior art, as described in, but are not limited to the following literatures: CN102827312A, CN101812145A, CN101531725A, CN104926962A, U.S. Pat. Nos. 6,103,658, and 6,660,677.

The branched polyethylene involved in the examples has the following characteristics: the degree of branching is 60 to 130 branches/1000 carbon atoms, the weight average molecular weight is 66,000 to 518,000, and the Mooney viscosity ML(1+4) at 125° C. is 6 to 102.

The rubber composition provided by the present invention includes a rubber matrix and essential components. The rubber matrix includes a branched polyethylene with a content represented as A, in which 0<A≤100, and an EPM and an EPDM with a total content represented as B, in which 0≤B<100. The essential components include 1.5 to 10 parts of a crosslinking agent and 40 to 200 parts of a reinforcing filler. The reinforcing filler includes two or more of carbon black, silica, calcium carbonate, talcum powder, calcined clay, magnesium silicate, and magnesium carbonate, wherein when the reinforcing filler includes carbon black or silica, the content of the carbon black is 5 to 100 parts, and the content of the silica is 5 to 60 parts. The silica in the reinforcing filler includes at least one of precipitated silica and fumed silica, and the carbon black in the reinforcing filler includes at least one of N220, N330, N550, N660, N774, and N990. The crosslinking agent includes at least one of a peroxide crosslinking agent and sulfur, wherein the peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The silica used in the examples of the present invention is fumed silica or precipitated silica. For an application occasion with lower requirements for transparency and electrical insulating property, preferably, the precipitated silica is used, and further preferably, high-dispersibility precipitated silica is used. Unless otherwise specified, the grade of the common precipitated silica used in the examples is Solvay Rhodia zeosil1142, and the grade of the high-dispersibility silica used in the examples is Solvay Rhodia zeosil165N.

The rubber composition provided by the present invention can also include auxiliary components. The auxiliary components include 0.2 to 20 parts of an auxiliary crosslinking agent, 5 to 100 parts of a plasticizer, 1 to 3 parts of a stabilizer, 2 to 10 parts of a metal oxide, 1 to 10 parts of a surface modifier, 0 to 3 parts of a vulcanization accelerator, and 0 to 20 parts of a binder, wherein the stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

The auxiliary crosslinking agent includes at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene)acetone, 1,2-polybutadiene, sulfur, and a metal salt of unsaturated carboxylic acid.

The metal salt of unsaturated carboxylic acid includes at least one of zinc acrylate, zinc methacrylate, magnesium methacrylate, calcium methacrylate, and aluminum methacrylate. The plasticizer includes at least one of pine tar, engine oil, naphthenic oil, paraffin oil, coumarone, RX-80, stearic acid, and paraffin.

The metal oxide includes at least one of zinc oxide, magnesium oxide, and calcium oxide.

The surface modifier includes at least one of polyethylene glycol, diphenyl silandiol, triethanolamine, vinyl tris(2-methoxyethoxy)silane (A-172), γ-glycidyloxypropyl trimethoxysilane (A-187), and γ-mercaptopropyl trimethoxysilane (A-189) with a molecular weight of 2000 or 3400 or 4000.

The vulcanization accelerator includes at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

The binder includes at least one of a resorcinol donor, a methylene donor, and a triazine binder.

The degree of branching of the branched polyethylene in the rubber composition is measured by means of nuclear magnetic hydrogen spectroscopy, and the molar percentages of various branches are measured by means of nuclear magnetic carbon spectroscopy. Specific details are as follows:

| Branched polyethylene No. | Degree of branching | Methyl/% | Ethyl/% | Propyl/% | Butyl/% | Pentyl/% | Hexyl or higher/% | Weight average molecular weight/ 10,000 | Molecular weight distribution | Mooney viscosity ML (1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |

-continued

| Branched polyethylene No. | Degree of branching | Methyl/% | Ethyl/% | Propyl/% | Butyl/% | Pentyl/% | Hexyl or higher/% | Weight average molecular weight/ 10,000 | Molecular weight distribution | Mooney viscosity ML (1 + 4) 125° C. |
|---|---|---|---|---|---|---|---|---|---|---|
| PER-8  | 70  | 66.5 | 7.2  | 4.6 | 3.2 | 3.2 | 15.3 | 43.6 | 2.1 | 93  |
| PER-9  | 60  | 68.1 | 7.1  | 4.2 | 2.7 | 2.8 | 15.1 | 51.8 | 2.2 | 102 |
| PER-10 | 87  | 61.8 | 10.3 | 5.4 | 4.6 | 4.9 | 12.0 | 40.1 | 1.8 | 101 |
| PER-11 | 94  | 60.5 | 10.8 | 5.7 | 4.7 | 4.9 | 13.3 | 37.8 | 2.0 | 85  |
| PER-12 | 102 | 56.8 | 12.7 | 6.1 | 5.2 | 5.1 | 13.9 | 34.8 | 1.9 | 66  |

Rubber Performance Test Method:

1. Hardness test: the test is performed by using a hardness tester in accordance with the national standard GB/T 531.1-2008, wherein the test temperature is room temperature.

2. Tensile strength and elongation at break performance test: the test is performed by using an electronic tensile tester in accordance with the national standard GB/T528-2009, wherein the tensile speed is 500 mm/min, the test temperature is 23±2° C., and the sample is a type 2 dumbbell-shaped sample.

3. Tear strength test: the test is performed by using an electronic tensile tester in accordance with the national standard GB/T529-2008, wherein the tensile speed is 500 mm/min, the test temperature is 23±2° C., and the sample is a right-angle sample.

4. Volume resistivity test: the test is performed by using a megger in accordance with the national standard GB/T1692-2008.

5. Mooney viscosity test: the test is performed by using a Mooney viscosity tester in accordance with the national standard GB/T1232.1-2000, wherein the test temperature is 125° C., the preheating time is 1 min, and the test time is 4 min.

6. Hot air accelerated aging test: the test is performed in a heat aging test box in accordance with the national standard GB/T3512-2001, wherein the test condition is 150° C.*72 h.

7. Test of top optimum cure time Tc90: the test is performed in a rotorless vulcanizer in accordance with the national standard GB/T16584-1996, wherein the test temperature is 160° C.

The vulcanization conditions of the following examples 1 to 10 and comparative examples 1 to 2 are unified as follows: the temperature is 160° C., the pressure is 16 MPa, and the time is Tc90+2 min.

In order to more clearly illustrate the performance of the rubber composition, the present invention is further described below in conjunction with specific examples.

Example 1

Branched polyethylene No. PER-5 was used.
The processing steps of the rubber composition were as follows:

(1) rubber mixing: the temperature of an internal mixer was set to be 90° C. and the rotor speed was set to be 50 r/min, 50 parts of EPDM and 50 parts of branched polyethylene were added, and pre-pressing and mixing were performed for 90 s; 40 parts of carbon black N550 and 10 parts of silica were added, and mixing was performed for 3 min; then, 3 parts of a crosslinking agent dicumyl peroxide (DCP) was added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 2

Branched polyethylene No. PER-5 was used.
The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; 40 parts of carbon black N550 and 10 parts of silica were added, and mixing was performed for 3 min; then, 3 parts of a crosslinking agent dicumyl peroxide (DCP) was added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Comparative Example 1

The processing steps were as follows:

(1) rubber mixing: the temperature of an internal mixer was set to be 90° C. and the rotor speed was set to be 50 r/min, 100 parts of EPDM was added, and pre-pressing and mixing were performed for 90 s; 40 parts of carbon black N550 and 10 parts of silica were added, and mixing was performed for 3 min; then, 3 parts of a crosslinking agent dicumyl peroxide (DCP) was added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 3

Branched polyethylene No. PER-9 was used.
The processing steps of the rubber composition were as follows:

(1) rubber mixing: the temperature of an internal mixer was set to be 90° C. and the rotor speed was set to be 50 r/min, 90 parts of EPDM and 10 parts of branched polyethylene were added, and pre-pressing and mixing were performed for 90 s; then, 5 parts of zinc oxide, 1 part of stearic acid, 5 parts of polyethylene glycol PEG4000, and 1 part of an anti-aging agent 2,2,4-trimethyl-1,2-dihydroquinoline polymer (RD) were added, and mixing was performed for 2 min; then, 80 parts of carbon black N550, 20 parts of silica, 20 parts of calcined clay, 20 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.3 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 4

Branched polyethylene No. PER-8 was used.

The processing steps of the rubber composition were as follows:

(1) rubber mixing: the temperature of an internal mixer was set to be 90° C. and the rotor speed was set to be 50 r/min, 20 parts of EPM, 50 parts of EPDM, and 30 parts of branched polyethylene were added, and pre-pressing and mixing were performed for 90 s; then, 5 parts of zinc oxide, 1 part of stearic acid, 5 parts of polyethylene glycol PEG4000, 1 part of an anti-aging agent 2,2,4-trimethyl-1,2-dihydroquinoline polymer (RD), and 1 part of vinyl tris (2-methoxyethoxy)silane (A-172) were added, and mixing was performed for 2 min; then, 80 parts of carbon black N550, 20 parts of silica, 20 parts of calcined clay, 15 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.2 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 5

Branched polyethylene No. PER-6 was used.

The processing steps of the rubber composition were as follows:

(1) rubber mixing: the temperature of an internal mixer was set to be 90° C. and the rotor speed was set to be 50 r/min, 30 parts of EPDM and 70 parts of branched polyethylene were added, and pre-pressing and mixing were performed for 90 s; then, 5 parts of zinc oxide, 1 part of stearic acid, 5 parts of polyethylene glycol PEG4000, and 1 part of an anti-aging agent 2,2,4-trimethyl-1,2-dihydroquinoline polymer (RD) were added, and mixing was performed for 2 min; then, 80 parts of carbon black N550, 20 parts of silica, 20 parts of calcined clay, 15 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.2 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 6

Branched polyethylene No. PER-5 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; then, 5 parts of zinc oxide, 1 part of stearic acid, 5 parts of polyethylene glycol PEG4000, and 1 part of an anti-aging agent 2,2,4-trimethyl-1,2-dihydroquinoline polymer (RD) were added, and mixing was performed for 2 min; then, 80 parts of carbon black N550, 20 parts of silica, 20 parts of calcined clay, 15 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.2 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Comparative Example 2

The processing steps were as follows:

(1) rubber mixing: the temperature of an internal mixer was set to be 90° C. and the rotor speed was set to be 50 r/min, 100 parts of EPDM was added, and pre-pressing and mixing were performed for 90 s; then, 5 parts of zinc oxide, 1 part of stearic acid, 5 parts of polyethylene glycol PEG4000, and 1 part of an anti-aging agent 2,2,4-trimethyl-1,2-dihydroquinoline polymer (RD) were added, and mixing was performed for 2 min; then, 80 parts of carbon black N550, 20 parts of silica, 20 parts of calcined clay, 15 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.2 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Performance Test Data Analysis

| Test Item | Example 1 | Example 2 | Comparative Example 1 | Example 3 | Example 4 | Example 5 | Example 6 | Comparative Example 2 |
|---|---|---|---|---|---|---|---|---|
| Hardness | 64 | 64 | 63 | 57 | 62 | 60 | 59 | 55 |
| Tensile strength/MPa | 18.7 | 20.5 | 16.3 | 12.1 | 14.2 | 15.9 | 17.2 | 11.8 |
| Elongation at break/% | 452 | 481 | 429 | 403 | 389 | 409 | 453 | 418 |
| Tear strength/(N/mm) | 34.7 | 39.2 | 31.6 | 31.2 | 33.8 | 35.9 | 38.6 | 29.2 |
| After aging (150° C. * 72 h) | | | | | | | | |
| Hardness | 68 | 67 | 67 | 66 | 70 | 68 | 66 | 65 |
| Retention rate of tensile strength/% | 83 | 84 | 81 | 78 | 81 | 82 | 79 | 76 |
| Retention rate of elongation at break/% | 85 | 82 | 84 | 61 | 63 | 72 | 77 | 58 |

Performance Test Data Analysis:

By means of comparison of the examples 1 to 2 and the comparative example 1 and comparison of the examples 3 to 6 and the comparative example 2, it can be found that as the proportion of the branched polyethylene replacing the ethylene propylene rubber increased, the tensile strength and tear strength of the obtained vulcanized rubber were obviously enhanced, thereby indicating that better mechanical properties can be obtained by using the rubber composition containing the branched polyethylene.

Example 7

Branched polyethylene No. PER-5 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; then, 10 parts of zinc oxide, 2 parts of stearic acid, 3 parts of polyethylene glycol PEG4000, 1 part of an anti-aging agent 2,2,4-trimethyl-1,2-dihydroquinoline polymer (RD), and 2 parts of vinyl tris(2-methoxyethoxy)silane (A-172) were added, and mixing was performed for 2 min; then, 100 parts of carbon black N550, 30 parts of silica, 30 parts of calcined clay, 40 parts of talcum powder, 20 parts of vaseline, and 60 parts of paraffin oil SUNPAR2280 were added, and mixing was performed for 3 min; then, 10 parts of a crosslinking agent dicumyl peroxide (DCP), 2 parts of an auxiliary crosslinking agent triallyl isocyanurate (TAIC), and 8 parts of an auxiliary crosslinking agent 1,2-polybutadiene were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 8

Branched polyethylene No. PER-4 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; then, 5 parts of zinc oxide, 1 part of stearic acid, 5 parts of polyethylene glycol PEG4000, 1 part of an anti-aging agent 2,2,4-trimethyl-1,2-dihydroquinoline polymer (RD), and 2 parts of vinyl tris(2-methoxyethoxy)silane (A-172) were added, and mixing was performed for 2 min; then, 20 parts of carbon black N550, 60 parts of silica, 40 parts of calcined clay, 15 parts of vaseline, and 30 parts of paraffin oil SUNPAR2280 were added, and mixing was performed for 3 min; then, 8 parts of a crosslinking agent dicumyl peroxide (DCP), 1 part of an auxiliary crosslinking agent triallyl isocyanurate (TAIC), and 6 parts of an auxiliary crosslinking agent 1,2-polybutadiene were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 9

Branched polyethylene Nos. PER-2 and PER-6 were used.

The processing steps of the rubber composition were as follows:

(1) rubber mixing: the temperature of an internal mixer was set to be 90° C. and the rotor speed was set to be 50 r/min, 70 parts of PER-6 and 30 parts of PER-2 were added, and pre-pressing and mixing were performed for 90 s; then, 5 parts of zinc oxide, 1 part of stearic acid, 2 parts of polyethylene glycol PEG4000, and 1 part of an anti-aging agent 2,2,4-trimethyl-1,2-dihydroquinoline polymer (RD) were added, and mixing was performed for 2 min; then, 35 parts of carbon black N550, 5 parts of silica, and 10 parts of paraffin oil SUNPAR2280 were added, and mixing was performed for 3 min; then, 1 part of a crosslinking agent dicumyl peroxide (DCP), 0.3 part of an auxiliary crosslinking agent triallyl isocyanurate (TAIC), 0.5 part of a crosslinking agent sulfur, 1 part of N-cyclohexyl-2-benzothiazole sulfenamide (CZ), and 0.8 part of tetramethylthiuram disulfide (TMTD) were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 10

Branched polyethylene Nos. PER-1 and PER-7 were used.

The processing steps of the rubber composition were as follows:

(1) rubber mixing: the temperature of an internal mixer was set to be 90° C. and the rotor speed was set to be 50 r/min, 80 parts of PER-7 and 20 parts of PER-1 were added, and pre-pressing and mixing were performed for 90 s; then, 10 parts of zinc oxide, 2 parts of stearic acid, 2 parts of polyethylene glycol PEG4000, and 1 part of an anti-aging agent 2,2,4-trimethyl-1,2-dihydroquinoline polymer (RD) were added, and mixing was performed for 2 min; then, 60 parts of carbon black N330, 20 parts of silica, and 20 parts of paraffin oil SUNPAR2280 were added, and mixing was performed for 3 min; then, 4 parts of a crosslinking agent bis(1-(tert-butylperoxy)-1-methylethyl)-benzene (BIPB), 1.5 parts of an auxiliary crosslinking agent triallyl isocyanurate (TAIC), and 15 parts of zinc methacrylate were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Performance test data was as shown in the following table:

| Test item | Example 7 | Example 8 | Example 9 | Example 10 |
|---|---|---|---|---|
| Hardness | 67 | 66 | 58 | 71 |
| Tensile strength/MPa | 15.4 | 13.2 | 18.2 | 20.2 |
| Elongation at break % | 368 | 539 | 522 | 489 |
| Tear strength N/mm | 37.2 | 42.1 | 35.8 | 49.7 |
| After aging (150° C. * 72 h) | | | | |
| Hardness | 74 | 75 | 62 | 79 |
| Retention rate of tensile strength/% | 75 | 83 | 81 | 89 |
| Retention rate of elongation at break/% | 72 | 79 | 78 | 87 |

A specific example of the present invention also provides application of the rubber composition in preparation of rubber products. The rubber products include high-strength insulation compound for wire and cable, waterproof coil, and high-temperature resistant conveyor belts. The specific implementation of the application was as follows:

Example 11

The present example is a high-strength insulation compound for wire and cable, which used the branched polyethylene No. PER-3, and the processing steps of the insulation compound were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; then, 10 parts of zinc oxide, 1 part of stearic acid, 2 parts of polyethylene glycol PEG4000, and 2 parts of vinyl tris(2-methoxyethoxy)silane (A-172) were added, and mixing was performed for 2 min; then, 5 parts of carbon black N330, 45 parts of silica, 2 parts of vaseline, and 15 parts of paraffin oil SUNPAR2280 were added, and mixing was performed for 3 min; then, 4 parts of a crosslinking agent dicumyl peroxide (DCP) and 0.3 part of an auxiliary crosslinking agent sulfur were added, mixing was performed for 2 min, and then, the rubber was discharged; the rubber mix was plasticated on an open mill, the roller spacing was increased to obtain a sheet of which the thickness was about 2.5 mm, the sheet was unloaded, and the sheet was allowed to stand for 20 h;

(2) granulation: the rubber mix was put into an extruding machine so as to be extruded, sheared, and granulated and then was packaged.

Vulcanization and performance test and vulcanization process: the steam vulcanization was performed at 155° C. for 40 min, and then, the vulcanized product was dipped in water.

Performance test: the hardness was 68, the tensile strength was 19.1 MPa, the elongation at break was 622%, and the volume resistivity was $3.8 \times 10^{15} \Omega \cdot cm$. After hot air aging at 150° C. for 72 h: the hardness was 74, the retention rate of the tensile strength was 75%, and the retention rate of the elongation at break was 72%.

Example 12

The present example is a waterproof coil and a production process thereof was as follows:

(1) mixing: the temperature of an internal mixer was set to be 90° C. and the rotor speed was set to be 50 r/min, 100 parts of branched polyethylene PER-5 was added, and pre-pressing and mixing were performed for 90 s; then, 5 parts of zinc oxide, 1 part of stearic acid, 5 parts of polyethylene glycol PEG4000, and 1 part of an anti-aging agent 2,2,4-trimethyl-1,2-dihydroquinoline polymer (RD) were added, and mixing was performed for 2 min; then, 80 parts of carbon black N550, 20 parts of silica, 20 parts of calcined clay, 15 parts of vaseline, and 30 parts of paraffin oil SUNPAR2280 were added, and mixing was performed for 3 min; then, 6 parts of a crosslinking agent dicumyl peroxide (DCP), 2 parts of an auxiliary crosslinking agent triallyl isocyanurate (TAIC), and 0.2 part of an auxiliary crosslinking agent sulfur were added, mixing was performed for 2 min, and then, the rubber was discharged; a blocky rubber mix was conveyed into an open mill so as to be mixed, the roller temperature was controlled to be between 85° C. and 95° C., the roller spacing was controlled to be less than 1 mm, the rubber was plasticated at least four times until the surface of the rubber mix was smooth, uniform and glossy, then, the rubber mix was further mixed and plasticated at least four times, the roller spacing was adjusted to be not greater than 8 mm, mixing was performed three times to obtain a uniformly-mixed rough rubber sheet of which the thickness was lower than 8 mm, the sheet was cooled to be lower than 50° C., and then, the sheet was discharged and stacked;

(2) hot milling: hot milling was performed on the uniformly-mixed rough rubber sheet on an open mill, the roller temperature was controlled to be between 85° C. and 95° C., the roller spacing was controlled to be less than 6 mm until the rubber material sheet was smooth and uniform, and then, the sheet was preliminarily coiled;

(3) calendering: the rubber sheet which was preliminarily coiled by means of hot milling was put on a calender, and the roller spacing was adjusted according to the thickness requirement of a finished product to perform calendering so as to obtain a semi-finished coil meeting the thickness specification requirement of the finished product;

(4) coiling: an isolation liner layer was sandwiched according to the specification length requirement of the finished coil, and the semi-finished coil was tidied into a coil;

(5) vulcanization: the coil which was tidied into a coil was put into a nitrogen-filled vulcanization kettle so as to be vulcanized, the temperature of the vulcanization kettle was controlled to be between 155° C. and 165° C., the pressure of the vulcanization kettle was controlled to be 20 MPa and 25 MPa, and vulcanization was performed for 25 to 30 min;

(6) recoiling: the vulcanized coil was opened again, the isolation liner layer was taken out, and then, the coil was recoiled and packaged to obtain a product.

Example 13

The present example is a high-temperature resistant conveyor belt including working surface covering rubber, non-working surface covering rubber, and a belt core tensile canvas arranged between the working surface covering rubber and the non-working surface covering rubber, and the components and proportions of the working surface covering rubber were metered in parts:

(1) Rubber Mixing Process:

primary mixing: the temperature of an internal mixer was set to be 90° C. and the rotor speed was set to be 50 r/min, 80 parts of PER-7 and 20 parts of PER-1 were added, and pre-pressing and mixing were performed for 90 s; then, 10 parts of zinc oxide, 2 parts of stearic acid, 2 parts of polyethylene glycol PEG4000, and 1 part of an anti-aging agent 2,2,4-trimethyl-1,2-dihydroquinoline polymer (RD) were added, and mixing was performed for 2 min; then, 60 parts of carbon black N330, 20 parts of silica, 2.5 parts of resorcinol (RS), and 20 parts of paraffin oil SUNPAR2280 were added, mixing was performed for 3 min, and then, the rubber was discharged; secondary mixing: the temperature of the internal mixer was set to be 90° C. and the rotor speed was set to be 50 r/min, then, 2 parts of a methylene donor RH was added, and mixing was performed for 2 min; then, 4 parts of a crosslinking agent bis(1-(tert-butylperoxy)-1-methylethyl)-benzene (BIPB), 1.5 parts of an auxiliary crosslinking agent triallyl isocyanurate (TAIC), and 15 parts of zinc methacrylate were added, mixing was performed for 2 min, and then, the rubber was discharged;

(2) Calendering Process:

the rubber mix was put into a screw extruder so as to be subjected to hot milling, then, the rubber mix after hot milling was conveyed into a calender so as to be calendered, and then, the sheet was discharged for later use; the thickness of the rubber sheet was controlled to be 4.5 to 12 mm in the processes of calendering and discharging the sheet; after the sheet was discharged, the temperature of the sheet was kept for later use;

(3) Forming Process:

the rubber sheet and a preformed rubberized canvas belt blank were closely attached together on a forming machine to form a belt blank of a high-temperature resistant conveyor belt, then, the belt blank was coiled, and after 4 h, the belt blank was vulcanized;

(4) Vulcanization Process:

the formed belt blank of the conveyor belt was put into a press vulcanizer so as to be vulcanized in sections, wherein for each plate, the vulcanization time was 25 min, the vulcanization pressure was 3 MPa, and the vulcanization temperature was 160° C.

Example 14

The present example is a cycle tire, and the processing steps of the sidewall rubber of the cycle tire were as follows:

(1) rubber mixing: the temperature of an internal mixer was set to be 90° C. and the rotor speed was set to be 50 r/min, 100 parts of branched polyethylene PER-5 was added, and pre-pressing and mixing were performed for 90 s; then, 5 parts of zinc oxide, 1 part of stearic acid, 2 parts of polyethylene glycol PEG4000, and 2 parts of vinyl tris(2-methoxyethoxy)silane (A-172) were added, and mixing was performed for 2 min; then, 40 parts of carbon black N330, 20 parts of high-dispersibility silica, and 10 parts of paraffin oil SUNPAR2280 were added, and mixing was performed for 3 min; then, 4 parts of a crosslinking agent dicumyl peroxide (DCP), 1.5 parts of an auxiliary crosslinking agent N,N'-m-phenylene bismaleimide (HVA-2), and 0.3 part of an auxiliary crosslinking agent sulfur were added, mixing was performed for 2 min, and then, the rubber was discharged; open milling was performed on the rubber mix on an open mill, then, the sheet was unloaded, the sheet was allowed to stand, and then, the sheet was detected;

(2) extrusion forming: extrusion forming was performed on the qualified rubber mix by means of an extruding machine to obtain a rubber part in a sidewall shape for later use.

Example 15

The present example is a cycle tire, and the processing steps of the sidewall rubber of the cycle tire were as follows:

(1) rubber mixing: the temperature of an internal mixer was set to be 90° C. and the rotor speed was set to be 50 r/min, 100 parts of branched polyethylene PER-12 was added, and pre-pressing and mixing were performed for 90 s; then, 5 parts of zinc oxide, 1 part of stearic acid, 2 parts of polyethylene glycol PEG4000, and 2 parts of vinyl tris(2-methoxyethoxy)silane (A-172) were added, and mixing was performed for 2 min; then, 40 parts of carbon black N330, 20 parts of high-dispersibility silica, and 10 parts of paraffin oil SUNPAR2280 were added, and mixing was performed for 3 min; then, 4 parts of a crosslinking agent dicumyl peroxide (DCP), 1.5 parts of an auxiliary crosslinking agent N,N'-m-phenylene bismaleimide (HVA-2), and 0.3 part of an auxiliary crosslinking agent sulfur were added, mixing was performed for 2 min, and then, the rubber was discharged; open milling was performed on the rubber mix on an open mill, then, the sheet was unloaded, the sheet was allowed to stand, and then, the sheet was detected;

(2) extrusion forming: extrusion forming was performed on the qualified rubber mix by means of an extruding machine to obtain a rubber part in a sidewall shape for later use.

Example 16

The present example is a cycle tire, and the processing steps of the tread rubber of the cycle tire were as follows:
(1) rubber mixing: the temperature of an internal mixer was set to be 90° C. and the rotor speed was set to be 50 r/min, 80 parts of PER-7 and 20 parts of PER-1 were added, and pre-pressing and mixing were performed for 90 s; then, 10 parts of zinc oxide, 2 parts of stearic acid, 2 parts of polyethylene glycol PEG4000, and 1 part of an anti-aging agent 2,2,4-trimethyl-1,2-dihydroquinoline polymer (RD) were added, and mixing was performed for 2 min; then, 60 parts of carbon black N330, 20 parts of silica, and 15 parts of paraffin oil SUNPAR2280 were added, and mixing was performed for 3 min; then, 4 parts of a crosslinking agent bis(1-(tert-butylperoxy)-1-methylethyl)-benzene (BIPB), 1.5 parts of an auxiliary crosslinking agent triallyl isocyanurate (TAIC), and 15 parts of zinc methacrylate were added, mixing was performed for 2 min, and then, the rubber was discharged; open milling was performed on the rubber mix on an open mill, then, the sheet was unloaded, the sheet was allowed to stand, and then, the sheet was detected;
(2) the qualified rubber mix was calendered to obtain an appropriate thickness, and then, the rubber mix with the appropriate thickness was cut into strips for later use;
(3) tread extrusion: a tread semi-finished product was extruded by an extruding machine according to a cold feeding extrusion process.

Example 17

The present example is a cycle tire, and the processing steps of the tread rubber of the cycle tire were as follows:
(1) rubber mixing: the temperature of an internal mixer was set to be 90° C. and the rotor speed was set to be 50 r/min, 70 parts of PER-11 and 30 parts of PER-3 were added, and pre-pressing and mixing were performed for 90 s; then, 10 parts of zinc oxide, 2 parts of stearic acid, 2 parts of coumarone resin, 2 parts of modified alkyl phenolic resin TKM-K, 2 parts of polyethylene glycol PEG4000, and 1 part of an anti-aging agent RD were added, and mixing was performed for 2 min; then, 60 parts of carbon black N330, 20 parts of silica, and 20 parts of paraffin oil SUNPAR2280 were added, and mixing was performed for 3 min; then, 4 parts of a crosslinking agent bis(1-(tert-butylperoxy)-1-methylethyl)-benzene (BIPB), 1.5 parts of an auxiliary crosslinking agent triallyl isocyanurate (TAIC), and 3 parts of zinc methacrylate were added, mixing was performed for 2 min, and then, the rubber was discharged; open milling was performed on the rubber mix on an open mill, then, the sheet was unloaded, the sheet was allowed to stand, and then, the sheet was detected;
(2) the qualified rubber mix was calendered to obtain an appropriate thickness, and then, the rubber mix with the appropriate thickness was cut into strips for later use;
(3) tread extrusion: a tread semi-finished product was extruded by an extruding machine according to a cold feeding extrusion process.

Example 18

The present example is a high-temperature resistant conveyor belt including working surface covering rubber, non-working surface covering rubber, and a belt core tensile canvas arranged between the two, and the composition and mixing process of the working surface covering rubber were as follows:
primary mixing: the temperature of an internal mixer was set to be 90° C. and the rotor speed was set to be 50 r/min, 100 parts of PER-12 was added, and pre-pressing and mixing were performed for 90 s; then, 10 parts of zinc oxide, 2 parts of stearic acid, 2 parts of polyethylene glycol PEG4000, and 1 part of an anti-aging agent RD were added, and mixing was performed for 2 min; then, 60 parts of carbon black N330, 20 parts of silica, 5 parts of a triazine binder AIR-1, 1 part of resorcinol (RS), and 20 parts of paraffin oil SUNPAR2280 were added, mixing was performed for 3 min, and then, the rubber was discharged; secondary mixing: the temperature of the internal mixer was set to be 90° C. and the rotor speed was set to be 50 r/min, then, 2 parts of a methylene donor RH was added, and mixing was performed for 2 min; then, 4 parts of a crosslinking agent bis(1-(tert-butylperoxy)-1-methylethyl)-benzene (BIPB), 1.5 parts of an auxiliary crosslinking agent triallyl isocyanurate (TAIC), and 15 parts of zinc methacrylate were added, mixing was performed for 2 min, and then, the rubber was discharged.

The other production processes were the same as those in the example 13.

Example 19

The present example is a rubber for a rubber metal damping part, and the components and mixing process of the rubber were as follows:
the temperature of an internal mixer was set to be 100° C. and the rotor speed was set to be 50 r/min, 40 parts of EPDM (keltan 9565Q) and 60 parts of PER-10 were added, and pre-pressing and mixing were performed for 90 s; then, 5 parts of zinc oxide, 1 part of stearic acid, 4 parts of a binder RS, 2 parts of polyethylene glycol PEG4000, and 1 part of an anti-aging agent RD were added, and mixing was performed for 2 min; then, 60 parts of carbon black N330, 20 parts of silica, and 20 parts of paraffin oil SUNPAR2280 were added, and mixing was performed for 3 min; then, 4 parts of a binder RA-65 was added, and mixing was performed for 1 min; then, 4 parts of a crosslinking agent bis(1-(tert-butylperoxy)-1-methylethyl)-benzene (BIPB), 1 part of an auxiliary crosslinking agent triallyl isocyanurate (TAIC), 0.5 part of sulfur, and 3 parts of zinc methacrylate were added, mixing was performed for 2 min, and then, the rubber was discharged; open milling was performed on the rubber mix on an open mill, then, the sheet was unloaded, and the sheet was allowed to stand for later use.

What is claimed is:
1. A rubber composition, comprising a rubber matrix and essential components, wherein:
based on 100 parts by weight of the rubber matrix, the rubber matrix comprises:
a branched polyethylene with a content represented as A, in which $0<A\leq100$, and
an EPM and an EPDM with a total content represented as B, in which $0\leq B<100$;
based on 100 parts by weight of the rubber matrix, the essential components comprise:
1.5 to 10 parts of a crosslinking agent, and
40 to 200 parts of a reinforcing filler;
the branched polyethylene comprises an ethylene homopolymer having a degree of branching of from 60 to 102 branches/1000 carbon atoms, a weight average molecular weight of from 268,000 to 518,000, and a Mooney viscosity ML(1+4) at 125° C. of from 42 to 102; and the reinforcing filler comprises carbon black and silica, wherein the content of the carbon black is 5 to 100 parts based on 100 parts by weight of the rubber matrix, and the content of the silica is 5 to 60 parts based on 100 parts by weight of the rubber matrix.

2. The rubber composition according to claim 1, wherein based on 100 parts by weight of the rubber matrix, the rubber matrix comprises a branched polyethylene with a content represented as A, in which 10≤A≤100, and an EPM and an EPDM with a total content represented as B, in which 0≤B≤90; and the branched polyethylene is an ethylene homopolymer having a degree of branching of from 80 to 102 branches/1000 carbon atoms.

3. The rubber composition according to claim 1, wherein the silica comprises at least one of precipitated silica and fumed silica.

4. The rubber composition according to claim 1, wherein the carbon black comprises at least one of N220, N330, N550, N660, N774, and N990.

5. The rubber composition according to claim 1, wherein the crosslinking agent comprises at least one of a peroxide crosslinking agent and sulfur, and the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl) benzene, 2,5-dimethyl-2,5-bis(benzoylperoxy)hexane, tert-butyl peroxybenzoate, and tert-butylperoxy-2-ethylhexyl carbonate.

6. The rubber composition according to claim 1, wherein the rubber composition also comprises auxiliary components, and based on 100 parts by weight of the rubber matrix, the auxiliary components comprise 0.2 to 20 parts of an auxiliary crosslinking agent, 5 to 100 parts of a plasticizer, 1 to 3 parts of a stabilizer, 2 to 10 parts of a metal oxide, 1 to 10 parts of a surface modifier, 0 to 3 parts of a vulcanization accelerator, and 0 to 20 parts of a binder.

7. The rubber composition according to claim 6, wherein the stabilizer comprises at least one of 2,2,4-trimethyl-1,2-dihydroquinoline polymer, 6-ethoxy-2,2,4-trimethyl-1,2-dihydroquinoline, 2-mercaptobenzimidazole, and N-4(anilinophenyl) maleimide; the auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene)acetone, 1,2-polybutadiene, sulfur, and unsaturated carboxylic acid metal salt, wherein the unsaturated carboxylic acid metal salt comprises at least one of zinc acrylate, zinc methacrylate, magnesium methacrylate, calcium methacrylate, and aluminum methacrylate; the plasticizer comprises at least one of pine tar, engine oil, naphthenic oil, paraffin oil, coumarone, stearic acid, paraffin, and liquid polyisobutylene; the metal oxide comprises at least one of zinc oxide, magnesium oxide, and calcium oxide; the surface modifier comprises at least one of polyethylene glycol, diphenyl silandiol, triethanolamine, vinyl tris(2-methoxyethoxy)silane, γ-glycidyloxypropyl trimethoxysilane, and γ-mercaptopropyl trimethoxysilane; the vulcanization accelerator comprises at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea; the binder comprises at least one of a resorcinol donor and a methylene donor.

8. A high-strength insulation compound for wire and cable comprising a rubber compound, wherein the rubber compound used for said insulation compound for high-strength wire and cable comprises said rubber composition according to claim 1.

9. A waterproof coil comprising a rubber compound, wherein the rubber compound used for said waterproof coil comprises said rubber composition according to claim 1.

10. A high-temperature resistant conveyor belt, having working surface covering rubber and non-working surface covering rubber, comprising a rubber compound, wherein, the rubber compound used for at least one of which comprises said rubber composition according to claim 1.

11. A tire comprising a rubber compound used for a sidewall of the tire and/or for the tread of the tire, wherein the rubber compound comprises said rubber composition according to claim 1.

12. The tire according to claim 11, wherein the tire is a cycle tire or an agricultural machine tire.

13. The rubber composition according to claim 1, wherein the branched polyethylene is an elastomer.

14. The rubber composition according to claim 1, wherein the reinforcing filler further comprises one or more fillers selected from the group consisting of calcium carbonate, talcum powder, calcined clay, magnesium silicate, and magnesium carbonate.

* * * * *